United States Patent [19]

Orshansky, Jr., deceased et al.

[11] 4,196,644
[45] Apr. 8, 1980

[54] HYDROMECHANICAL TRANSMISSION WITH COMPOUND PLANETARY ASSEMBLY

[75] Inventors: Elias Orshansky, Jr., deceased, late of San Francisco, Calif., by Betty B. Orshansky, executrix; William E. Weseloh, San Diego, Calif.

[73] Assignee: Orshansky Transmission Corporation, New York, N.Y.

[21] Appl. No.: 902,211

[22] Filed: May 2, 1978

[51] Int. Cl.² ............................................. F16H 47/04
[52] U.S. Cl. ...................................... 74/687; 74/688; 74/730
[58] Field of Search .......................... 74/687, 688, 730

[56] References Cited
U.S. PATENT DOCUMENTS

| | | | |
|---|---|---|---|
| 3,665,787 | 5/1972 | Wilkinson | 74/687 X |
| 3,851,544 | 12/1974 | Herman | 74/687 X |
| 3,888,139 | 6/1975 | Orshansky | 74/687 |
| 4,134,311 | 1/1979 | Orshansky | 74/687 |

*Primary Examiner*—C. J. Husar
*Assistant Examiner*—Frank McKenzie

*Attorney, Agent, or Firm*—Owen, Wickersham & Erickson

[57] ABSTRACT

A power transmission having three distinct ranges: (1) hydrostatic, (2) simple power-split hydromechanical, and (3) compound power-split hydromechanical. A single compound planetary assembly has two sun gears, two ring gears, and a single carrier with two sets of elongated planet gears. The two sun gears may be identical in size, and the two ring gears may be identical in size. A speed-varying module in driving relationship to the first sun gear is clutchable, in turn, to (1) the input shaft and (2) the second sun gear. The speed-varying means may comprise a pair of hydraulic units hydraulically interconnected so that one serves as a pump while the other serves as a motor and vice versa, one of the units having a variable stroke and being the one clutchable to either the input shaft or to the second sun gear. The other unit, which may have a fixed stroke, is connected in driving relation to the first sun gear. A brake grounds the carrier in the first range and in reverse and causes drive to be delivered to the output shaft through the first ring gear in a hydrostatic mode, the first ring gear being rigidly connected to the output shaft. The input shaft is also clutchable to the second ring gear of the compound planetary assembly.

5 Claims, 3 Drawing Figures

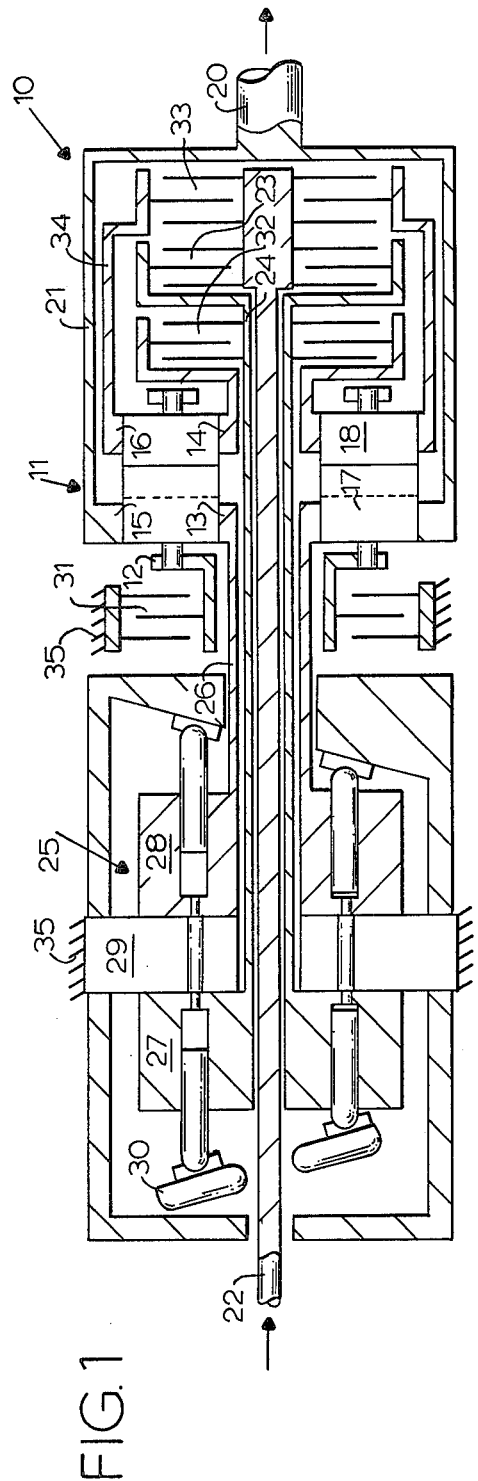
FIG.1
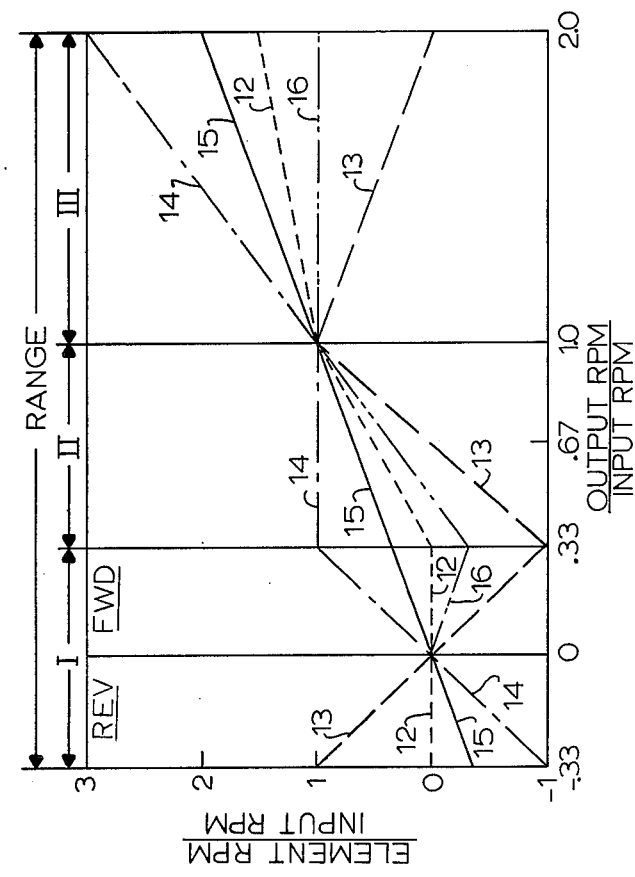
FIG.2
FIG.3

HYDROMECHANICAL TRANSMISSION WITH COMPOUND PLANETARY ASSEMBLY

The Government has rights in this invention pursuant to contract number EY-76-C-03-1165 awarded by the United States Department of Energy.

BACKGROUND OF THE INVENTION

This invention relates to an improved transmission. It may be considered an improvement on the hydromechanical transmission described in U.S. Pat. No. 3,888,139 which issued June 10, 1975, to Elias Orshansky, Jr.

The transmission of U.S. Pat. No. 3,888,139, and the transmission of the present invention each provide a hydromechanical infinitely variable transmission. Each provides for improved utilization of vehicle engine power by enabling the engine to operate within a narrow speed range which has been optimized for minimum emissions, maximum fuel economy and maximum power, regardless of vehicle operating conditions.

In U.S. Pat. No. 3,888,139 the hydraulic units used as a speed-varying means were driven by gears from either the input or the reaction or both. The present invention eliminates those gears, four gears altogether, and their bearings in order to reduce the size and weight of the transmission and reduce the cost of the transmission. It also employs a single compound planetary assembly instead of a plurality of planetary assemblies.

It is also an object to provide a transmission which can weigh less than conventional transmissions.

The transmission of this invention has a concentric or coaxial construction and an entirely different hydrostatic start from the transmission of U.S. Pat. No. 3,888,139, in order to provide reduction in the number of parts, the size, the weight, and also the cost of the transmission.

In order to avoid having to use the extra gears which connected the planetary assemblies to the hydraulic units in U.S. Pat. No. 3,888,139, the hydraulic units in the present invention are especially designed to be installed in line with the single planetary assembly without a separate gear drive. This considerably reduces power losses, size, weight, and cost.

A conventional torque converter or manual transmission requires the imposition of many compromises upon the engine, because it must provide adequate performance over a wide range of torque and speed. The practice of most vehicle manufacturers of providing a selection of optional axle ratios for the vehicle is only one of the many attempts which have been made to reduce the compromise for any given application.

The infinitely variable transmission of this invention enables the engine to be operated at all times in a speed range in which it is capable of producing rated power. Therefore, vehicle performance in any given application can be maintained or even improved while utilizing a smaller engine. In contrast, infinitely variable trans-missions of the pure hydrostatic type are limited to applications where significant power losses can be tolerated in return for the benefits of improved transmission ratio control.

Hydromechanical transmissions offer the control benefits of hydrostatic transmission, and, since only a portion of the engine power is transmitted by the hydraulic units, they provide a means for removing the performance barrier of excessive power losses. The extent to which any hydromechanical transmission can accomplish this is a function of the percentage of power which must be transmitted hydraulically.

The new transmission of this invention can transmit high horsepower over a wide range of output speed variation at a constant input speed and horsepower. It differs from the previous transmissions in its ability to transmit power over a wide range with a minimum of transmitted hydraulic horsepower, and a minimum of installed hydraulic horsepower. It also provides full engine braking over its entire range of operation.

The invention avoids the pitfalls of excessive complexity, speeds, or loads in the gear train. Maximum reliability and minimum cost have been obtained by utilizing standard commercial hydraulic unit design practice, enabling operation totally within their long-life rated conditions of speed and power. In addition, the clutches can utilize the same low-cost paper elements presently employed in high production automobile torque converter transmissions. For a comparable power rating, a smaller number of elements than in a torque converter power shift transmission can be utilized, because at all shift points the clutch elements are virtually synchronous. The number of elements is, therefore, a function not of their thermal capacity, but of their steady-state torque capacity.

This new transmission is valuable for use in passenger and competition cars, highway and off-highway trucks, buses, agricultural and construction equipment, military vehicles, and industrial drives and machine tools.

For passenger use especially, the invention is advantageous for providing very high efficiencies at the highest output-to-input speed ratios.

With this invention it is possible to design transmissions having an extremely wide range of speed and torque variation at full power. This is required in construction and off-highway equipment, for example, where torque multiplication of the order of 18:1 may be encountered. Machine tool drives may require even wider ranges, and they are possible.

The use of this transmission in a piston-engine vehicle enables reduction of exhaust emissions and improvement in the specific fuel consumption by programming the engine to operate within its optimum range under all road conditions without regard to transmission torque output requirements. Both hydrocarbon and nitrogen oxide emissions can be minimized by optimizing the engine for operation in a specific narrow range. In addition, a smaller engine may be utilized for any application, as the transmission enables full engine power to be developed at any vehicle speed except for the lower speeds where the vehicle is traction limited. It is particularly desirable to operate turbocharged diesel engines in a narrow range of speed.

Rotary combustion engines can use this new transmission with the same advantages as for piston engines. The benefit in reduction of hydrocarbon emissions is there of a much greater magnitude, however, due to the high rate of change in emission characteristics for rotary combustion engines with respect to engine speed.

Gas turbines would also be benefited significantly by this invention. Manufacturing cost is a major drawback in producing a turbine today. This, to a large degree, is a function of the complexity required in the design of a turbine for use under the varying torque and speed conditions of a road vehicle. With the hydromechanical transmission of this invention, the turbine can be programmed to operate only under those conditions during which it is most efficient. Therefore, a single-shaft turbine becomes feasible, as it is more economical to manufacture than the two-shaft design normally proposed for vehicle application. Since constant-speed operation is feasible, the problems in connection with the throttle response time of a turbine do not arise. Because there is an infinite variation in speed and torque in the transmission, and no interruption of power flow occurs at any time, the turbine design speed may be maintained.

SUMMARY OF THE INVENTION

The power transmission of the invention has three distinct ranges: (1) a hydrostatic range for starting and low speeds, (2) a simple power-split hydromechanical range for mid-speeds, and (3) a compound power-split hydromechanical range for high speeds. The transmission includes, in combination with input means and output means, a single planetary assembly having a single carrier with planet gears, two sun gears, and two ring gears. Both of the sun gears may be the same size, and the two ring gears may be the same size. The speed-varying module may comprise a pair of hydraulic units hydraulically interconnected so that one serves as a pump while the other serves as a motor and vice versa, one of the hydraulic units being clutchable to either the input shaft or the second sun gear, the other hydraulic unit being connected in driving relation to the first sun gear.

A brake may be used for grounding the carrier and causing the drive from the speed-varying module through the first set of planetary gears to be delivered to the output means through the first ring gear, which is rigidly connected to the output means. A first clutching arrangement can connect the speed-varying module to the input means while the brake is engaged in Range I, a hydrostatic mode. The first clutch also remains engaged after the brake is released and while a second clutching arrangement connects the second sun gear to the speed-varying module for operation in Range II, a simple power-split hydromechanical mode. The second clutching arrangement remains engaged after the first clutch is released in Range III, a compound-split hydromechanical mode in which a third clutching arrangement connects the input shaft to the second ring gear.

The brake is used in both reverse and for starting in the hydrostatic Range I, in conjunction with the first clutch. The speed-varying module can be run in reverse, forward, or zero drive, and at varying speeds in forward or reverse, such as by respective strokings of a controlling wobble-plate.

The speed of the second sun gear of the planetary assembly increases during forward transmission drive in Range I and at the end of that range becomes equal to the speed of the input shaft. At that point, the second sun gear is clutched to the hydraulic speed-varying module, and then the brake is released. The transmission is now hydromechanical, with a simple power-split, and is in Range II.

During Range II, the speed of every element of the two planetary assemblies is either at or approaching the speed of the input shaft, and at the end of Range II, when every element reaches that speed, a shift is made into Range III by clutching the second ring gear to the input shaft. Then the clutch connecting the input shaft to the speed-varying module is disengaged.

In Range III, there is a compound split to avoid recirculating power, and the second ring gear stays at the speed of the input shaft, while the first ring gear, rotating with the output shaft at the output speed, continues to increase in speed.

The range shifts in this new transmission occur at synchronized speeds, without interruption of power flow on either the upshift or the downshift. The starting and reverse ranges are hydrostatic and are not considered part of the working ranges. In most cases, the starting and reverse ranges operate at less than maximum power and may approach a maximum constant torque, since maximum output torque may be limited by either maximum pressure or traction. The working ranges are considered to be Ranges II and III, which may operate at full and constant horsepower.

BRIEF DESCRIPTION OF THE DRAWINGS

In the drawings:

FIG. 1 is a diagrammatic view in elevation and in section of a transmission illustrating the principles of this invention.

FIG. 2 is a brake and clutch engagement and range diagram.

FIG. 3 is a speed lines diagram with the ratio of output speeds to input speeds, in r.p.m. being plotted against the ratio of the speeds of the planetary members to the input speeds in r.p.m. The three forward ranges and the reverse range are identified.

DESCRIPTION OF THE PREFERRED EMBODIMENT

A transmission 10 of this invention has a single compound planetary assembly 11, a single carrier 12, two sun gears 13 and 14, and two ring gears 15 and 16. The carrier 12 has two intermeshed planet sets 17 and 18. Each pair of gears—the sun gears 13 and 14, the ring gears 15 and 16, and the sets of planetary gears 17 and 18—may be identical. The first ring gear 15 is mounted rigidly to the output shaft 20, as by a drum 21. The compound planetary assembly 11, therefore, comprises two simple planetary assemblies having a common carrier 12 and two intermeshed sets of planet gears 17 and 18. The compound planetary assembly 11 has seven elements, five of which can be used for input, for output, for reaction, or for output sometimes and reaction at other times.

Both ring-to-sun ratios may be made equal to 3:1. If this is done, the hydraulic power will be identical on both sides of the two shift points, and therefore the efficiencies on both sides of the two shift points will be identical.

An input shaft 22 is clutchable by a clutch 23 to a hollow shaft 24 which is in driving relation with a speed-varying hydraulic module 25, the other end of which is suitably connected to a hollow shaft 26 that carries the first sun gears 13. The module 25 comprises a variable-displacement hydraulic unit 27 in driving relationship with a fixed-displacement hydraulic unit 28, with hydraulic fluid transmitted between them through a stationary port plate block 29. A wobble plate 30 is provided for the hydraulic unit 27.

A brake 31, when engaged, holds the carrier 12 stationary. A clutch 32 is provided for connecting the second sun gear 14 to the hollow shaft 24, which is connected to the hydraulic unit 27. A clutch 33 enables connecting the input shaft 22 to the second ring gear 16 via a drum 34. The brake 31 and the clutch 23 are engaged in the reverse range and in the starting forward Range I. The clutches 23 and 32 are engaged in Range II, and the clutches 32 and 33 are engaged in Range III.

The input shaft 22, output shaft 20, hydraulic units 27 and 28, and the planetary assembly 11, are all coaxial.

When the brake 31 is engaged, the carrier 12 is held stationary relative to a frame 35, and the planetary gears 17 and 18 rotate but are arrested in their planetary motion. This makes a reversing drive between the first sun gear 13 and the first ring gear 15, causing a rotation of the first ring gear 15 which is reversed in rotation to that of the first sun gear 13.

The low-range brake 31 is engaged for starting (and also for reverse), as is also the clutch 23, causing a driving connection between the input shaft 22 and the sun gear 13, via the speed-varying module 25 and a driving connection from the sun gear 13 through the planetary gears 17, the ring gear 15, and the drum 21 to the output shaft 20. The first ring gear 15 runs in a reverse direction and at a reduced speed with respect to the sun gear 13. In this region the drive is purely hydrostatic, and when the variable-displacement hydraulic unit 27 is on zero stroke, the vehicle is at a standstill, since no drive is then coming through the speed-varying module 25 and since the brake 31 is engaged.

If the wobble plate 30 of the variable-displacement unit 27 is stroked in one direction, the transmission 10 is in reverse, and if the wobble plate 30 is stroked in the opposite direction, the transmission 10 is in forward. When the wobble plate 30 is stroked in forward, the sun gear 13 traverses in speed from zero to a negative speed, as shown in Range I in FIG. 3, and with the carrier 12 grounded by the brake 31, the first ring gear 15 increases from zero output speed, as shown in Range I in FIG. 3.

During Range I, the second sun gear 14, increases in speed exactly opposite to the first sun gear 13, and the second ring gear 16 runs at a negative speed, slower than does the first sun gear 13.

When the forward speed of the second sun gear 14 becomes equal to the forward speed of the input shaft 21, the clutch 23 is engaged, and the transmission 10 goes into Range II, the brake 31 then being released but the clutch 23 remaining in engagement. The transmission 10 is then in a hydromechanical mode with a simple power split.

The drive is then from the input shaft 22 through the clutch 23 to the hollow shaft 24 and therefrom via the clutch 32 to the second sun gear 14, which throughout Range II rotates at the speed of the input shaft 22. The low-range brake 31 may simply slip, producing some loss, but such losses are usually very low. Reaction is provided by the first sun gear 13, which is connected to the hydraulic unit 28. Reaction power is transmitted between the gear 13 and the input shaft 22, via the speed-varying module 25, the hollow shafts 24 and 26, and the clutch 23. Power is transmitted to the output shaft 20 through the ring gear 15, as in all ranges.

When the end of Range II is reached, the speeds of all the planetary elements are identical—exactly the speed of the input shaft 22—and it is thus possible to engage the clutch 33 to put the transmission into the high Range III, immediately thereafter releasing the clutch 23 but leaving the clutch 32 engaged. The result is to produce a compound-split hydromechanical range.

The input shaft 22 in Range III is clutched directly to the second ring gear 16. The second ring gear 16 transmits power via the planet gears 18 and 17 to the first ring gear 15 and also to that gear via the second sun gear 14, clutch 32, hollow shaft 24, hydraulic units 27 and 28, hollow shaft 26, and the first sun gear 13 (serving as reaction gear). As a result there is no recirculatory power in this range, in which there is a compound power split.

The three ranges are thus each fundamentally different from each other. Range I is hydrostatic, Range II a simple power split, and Range III a compound power split, both Ranges II and III being hydromechanical. This arrangement is therefore advantageous for operations where the highest efficiencies are most important at the highest output-to-input speed ratios, such as in passenger cars. Range I is the least efficient and is the least used. Range III is the most efficient and is the most often used.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A power transmission comprising:
   a stationary frame,
   input means,
   output means,
   a compound planetary assembly having a carrier with planet gears, two sun gears, and two ring gears, the ring gear of said first planetary assembly being rigidly connected to said output means,
   a reversible speed-varying module to which the first said sun gear is in driving connection,
   braking means for releasably connecting said carrier to said frame,
   first releasable clutching means for connecting said input means to said speed-varying module,
   second releasable clutching means for connecting the second said sun gear to said speed-varying module, and
   third releasable clutching means for connecting said input means to the second ring gear of said planetary assembly.

2. The power transmission of claim 1 wherein said speed-varying module comprises:
   a pair of hydraulic pump-motor units hydraulically interconnected so that one serves as a pump while the other serves as a motor and vice versa, and
   a first said hydraulic pump-motor unit being connected in driving relation to a hollow shaft separately clutchable to said input and to said second sun gear, and
   a second said hydraulic pump-motor unit being connected to said first sun gear.

3. A power transmission according to claim 2 wherein said first hydraulic pump-motor unit is variable in stroke and runs during operation at constant speed relative to the input while said second pump-motor unit is fixed in stroke and variable in speed.

4. A power transmission according to claim 2 wherein said first and second sun gears are identical in size and said first and second ring gears are identical in size.

5. The power transmission according to claim 2 wherein both ring gears are related to their respective sun gears by a ring-to-sun ratio of 3:1, whereby hydraulic power and efficiencies are identical on both sides of each shift point.

* * * * *